(12) United States Patent
Kanamaru et al.

(10) Patent No.: US 7,664,884 B2
(45) Date of Patent: Feb. 16, 2010

(54) MEDIA DRIVE THAT CREATES A TRANSFER UNNECESSARY PERIOD, AND POWER SAVING METHOD THEREOF

(75) Inventors: Atsushi Kanamaru, Kanagawa (JP); Tadahisa Kawa, Kanagawa (JP); Hiromi Kobayashi, Kanagawa (JP); Hirofumi Saitoh, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 7 days.

(21) Appl. No.: 11/267,539

(22) Filed: Nov. 4, 2005

(65) Prior Publication Data

US 2006/0101174 A1 May 11, 2006

(30) Foreign Application Priority Data

Nov. 11, 2004 (JP) ............................. 2004-327536

(51) Int. Cl.

| | |
|---|---|
| G06F 3/00 | (2006.01) |
| G06F 5/00 | (2006.01) |
| G06F 13/12 | (2006.01) |
| G06F 13/38 | (2006.01) |
| G06F 13/14 | (2006.01) |
| G06F 13/36 | (2006.01) |
| G06F 13/40 | (2006.01) |
| G06F 13/20 | (2006.01) |
| G06F 13/00 | (2006.01) |
| G06F 1/00 | (2006.01) |
| G06F 1/26 | (2006.01) |
| G06F 1/32 | (2006.01) |

(52) U.S. Cl. ............................... 710/5; 710/52; 710/53; 710/54; 710/55; 710/56; 710/57; 710/58; 710/59; 710/60; 710/74; 710/305; 710/306; 710/307; 710/308; 710/309; 710/310; 710/311; 710/312; 710/313; 710/314; 710/315; 710/316; 710/317; 713/300; 713/310; 713/320; 713/321; 713/322; 713/323; 713/324

(58) Field of Classification Search ............. 710/52–60, 710/74, 305–317; 713/300, 310, 320–324
See application file for complete search history.

(56) References Cited

U.S. PATENT DOCUMENTS 4,607,348 A * 8/1986 Sheth .......................... 710/57

(Continued)

FOREIGN PATENT DOCUMENTS

| JP | 2003-316523 | 11/2003 |
|---|---|---|
| JP | 2004-258695 | 9/2004 |

*Primary Examiner*—Henry W. H. Tsai
*Assistant Examiner*—Kris Rhu
(74) *Attorney, Agent, or Firm*—Townsend and Townsend and Crew LLP; Patrick Duncan (57) ABSTRACT

Embodiments of the present invention provide a media drive that is intended for reduction in power consumption required for serial communications to/from a host, and a power saving method thereof. In one embodiment, a HDD includes: a cache; a host interface for transferring, to a host, transfer data read out from the cache; a host interface manager that controls the execution of commands so as to generate a transfer unnecessary period during which a command and transfer data need not be exchanged with the host; and a MPU that brings a serial communication part of the host interface into a power save mode during the transfer unnecessary period. The host interface manager determines the optimum data transfer timing of transferring data from the cache to the host on the basis of a transfer rate at which data is transferred to the host, and a read rate at which data is read out from a disk into the cache.

11 Claims, 4 Drawing Sheets

U.S. PATENT DOCUMENTS

| | | | |
|---|---|---|---|
| 4,860,193 A * | 8/1989 | Bentley et al. | 710/55 |
| 5,787,292 A * | 7/1998 | Ottesen et al. | 713/300 |
| 6,647,499 B1 * | 11/2003 | Morcom | 713/300 |
| 7,213,086 B2 * | 5/2007 | Wyatt et al. | 710/52 |
| 7,269,106 B2 * | 9/2007 | Wijnands et al. | 369/47.23 |
| 2002/0059276 A1 * | 5/2002 | Wei Loon et al. | 707/100 |
| 2004/0015731 A1 * | 1/2004 | Chu et al. | 713/300 |
| 2005/0235171 A1 * | 10/2005 | Igari | 713/323 |
| 2006/0069932 A1 * | 3/2006 | Oshikawa et al. | 713/300 |
| 2007/0097816 A1 * | 5/2007 | Van Gassel | 369/47.33 |

\* cited by examiner

MEDIA DRIVE THAT CREATES A TRANSFER UNNECESSARY PERIOD, AND POWER SAVING METHOD THEREOF

CROSS-REFERENCES TO RELATED APPLICATIONS

This application claims priority from Japanese Patent Application No. JP2004-327536, filed Nov. 11, 2004, the entire disclosure of which is incorporated herein by reference.

BACKGROUND OF THE INVENTION

The present invention relates to a media drive that exchanges a command and transfer data with a host by means of serial communications, and to a power saving method thereof. The present invention, in particular, relates to a media drive that is intended for reduction in power consumption in serial communications, and to a power saving method thereof.

Devices using various types of media such as optical disks and magnetic tapes are known as information recording and reproducing devices. Among them, hard disk drives (hereinafter referred to as "HDD") have become popular as storage devices for computers to such an extent that they are one of the storage devices indispensable for today's computer systems. Further, not limited to computers, their application is widening more and more due to the superior characteristics with the advent of moving picture recording/reproducing devices, car navigation systems, removable memories for digital cameras and so on.

From the viewpoint of the environmental protection, the long-time operation of portable devices with built-in power supply, or the like, it is necessary to further reduce the power consumption of external storage devices such as a HDD. For example, with the object of reducing the power consumption, besides an "Active" mode in which no operation for power saving is performed, HDDs are usually provided with a plurality of power save modes including an "Idle" mode in which no read and write operations are performed but track following, and a "Standby" mode in which a spindle motor for rotating a disk is stopped so that the power consumption is reduced. For example, during the non-operating period, during which no command is received from the host, the devices are brought into these power save modes so as to reduce the power consumption (refer to a patent document 1 (Japanese Patent Laid-Open No. 2000-173152)).

Incidentally, almost all of HDDs, which are built into personal computers (PC) excluding servers and some workstations, adopt ATA (AT Attachment) or IDE (Integrated Drive Electronics) interface. In addition, as a result of the improvement in performance and increase in capacity of the ATA interface, even entry servers adopt ATA as a hard disk interface in recent years because costs of both a drive and a controller are low as compared with costs when SCSI (small computer system interface) is adopted. It is to be desired that a further improvement in performance be achieved without losing advantages of ATA, one of which is very low cost in contrast to the expensive SCSI interface.

As one method for achieving the improvement in performance, instead of the transmission method by means of the conventional parallel transmission, the serial transmission method is proposed to speed up the exchange of data with a host. The serial transmission has a feature advantageous to speedup. More specifically, as compared with the parallel transmission, the number of signal lines dramatically decreases, and accordingly less interference occurs between signal lines as compared with the parallel transmission. Standards of this Serial ATA (hereinafter referred to as "SATA") are being defined by Serial ATA Working Group constituted of, for example, main hard disk vendors.

In the SATA II (Non-patent literature 1 ("Serial ATA II: Extensions to Serial ATA 1.0a" [searched on Nov. 1, 2004] Internet<URL: http://www.serialata.org/specifications.asp>)), a command queuing technology called NCQ (Native Command Queuing) is adopted to achieve a further improvement in performance. The NCQ permits a HDD itself to internally determine the execution order of commands that are queued. This makes it possible to effectively reduce the sum of the seek time and the rotational latency, which is influenced by the mechanical internal operation of the HDD.

BRIEF SUMMARY OF THE INVENTION

In the SATA, however, in order to keep serial communications to/from the host operating, the additional electric power is newly required besides the power consumption of the conventional parallel ATA. For this reason, with the object of reducing the power consumption of the SATA to a level of the PATA, the SATA is provided with several power save modes so that the power consumption of this SATA interface part is reduced. To be more specific, in response to a period of time required for return, two power save modes are provided: the "Partial" mode, the return time of which is short; and the "Slumber" mode, the return time of which is long. In order to further improve the performance of a HDD, it is important to effectively use these power save modes so that the power consumption of the SATA interface part is efficiently reduced.

Additionally, the SATA simplifies specifications to achieve lower costs in comparison with the SCSI. For this reason, the number of queues, and the number of commands that can be stored in a queue, are smaller than those of the SCSI. However, even if the number of commands which can be stored in a queue is limited, if it is possible to queue commands as many as possible, an effect of rescheduling can be produced, and accordingly a further improvement in performance can be expected.

The present invention has been made in view of the foregoing. A feature of the present invention is to provide a media drive that is intended for the reduction in power consumption required for serial communications to/from a host, and a power saving method thereof. Another feature of the present invention is to provide a media drive that can shorten the processing time of commands by making the most of the performance thereof even if the number of commands that can be queued is limited, and a power saving method thereof.

In accordance with an aspect of the present invention, a media drive that exchanges a command and transfer data with a host by means of serial communications, is characterized by including: a temporary storage unit which temporarily stores transfer data read out from a medium; a serial communication unit which transfers, to the host, the transfer data read out from the temporary storage unit; a command execution controller which controls execution of one or more commands so as to generate a transfer unnecessary period during which the command and the transfer data need not be exchanged with the host; and a communication controller which brings the serial communication unit into a power save mode during the transfer unnecessary period; wherein the command execution controller controls the data transfer timing, at which data is transferred from the temporary storage unit to the host, so as to generate the transfer unnecessary period.

According to the present invention, a transfer unnecessary period is generated by controlling the data transfer timing at which read data is transferred to a host, and the serial communication unit is brought into a power save mode during the transfer unnecessary period. This makes it possible to reduce the power consumption during serial communications.

In addition, the command execution controller can control the data transfer timing on the basis of a medium transfer rate at which the transfer data is read out from the medium into the temporary storage unit, and a host transfer rate at which the transfer data is transferred from the temporary storage unit to the host.

Moreover, when transferring transfer data stored in the medium to the host, if the host transfer rate is higher than the medium transfer rate, the command execution controller can delay the data transfer timing by a specified period of time relative to the read timing at which the transfer data is read out from the medium into the temporary storage unit.

In this case, the specified period of time is the difference between the medium transfer time taken to read out the transfer data from the medium at the medium transfer rate and the host transfer time taken to transfer the transfer data in question to the host at the host transfer rate. Even if the medium transfer rate differs from the data transfer rate, it is possible to determine the optimum data transfer timing.

Further, the medium has a plurality of zones, and has the medium transfer rates that differ from one another on a zone basis. Additionally, the medium has the plurality of host transfer rates.

In this case, on the assumptions that a period of time required to transfer data to the host at the host transfer rate is a host transfer time, and that a period of time required to read out data into the temporary storage unit at a medium transfer rate corresponding to each of the zones is a medium transfer time, the command execution controller can determine the read timing and the data transfer timing on the basis of the host transfer time and the medium transfer time corresponding to each of the zones.

Still further, the transfer data is formed of a plurality of sectors. The command execution controller calculates the number of read-ahead sectors from a read-ahead ratio, which is calculated on the basis of the host transfer time per sector and the medium transfer time per sector, and from the number of the sectors of the transfer data. Then, the command execution controller adopts, as the data transfer timing, timing at which the transfer data, the size of which is equivalent to the number of read-ahead sectors, has been read out from the medium into the temporary storage unit. Thus, it is possible to determine the optimum data transfer timing.

Furthermore, the command execution controller refers to a table in which the read-ahead ratio is stored, and thereby can calculate the number of read-ahead sectors. Referring to the table makes it possible to reduce the overhead caused by calculation.

A media drive that exchanges a command and transfer data with a host by means of serial communications, according to another aspect of the present invention, is characterized by including: a serial communication unit which is adapted to receive, from the host, transfer data to be written to the medium; a temporary storage unit which temporarily stores the transfer data received from the host; a command execution controller which controls the execution of one or more commands so as to generate a transfer unnecessary period during which the command and the transfer data need not be exchanged with the host; and a communication controller which brings the serial communication unit into a power save mode during the transfer unnecessary period; wherein the command execution controller controls the data transfer timing, at which the transfer data is transferred from the host, so as to generate the transfer unnecessary period.

According to specific embodiments of the present invention, a transfer unnecessary period is generated by controlling the data transfer timing at which write data is transferred from the host, and the serial communication unit is brought into the power save mode during the transfer unnecessary period. This makes it possible to reduce the power consumption during serial communications.

In addition, the command execution controller can control the data transfer timing on the basis of a medium transfer rate at which data in the temporary storage unit is written to the medium, and a host transfer rate at which the transfer data is transferred from the host to the temporary storage unit.

Moreover, if the amount of free space of the temporary storage unit is smaller than the size of the transfer data, and the host transfer rate is higher than the medium transfer rate, the command execution controller can adopt, as the data transfer timing, timing at which the amount of free space of the temporary storage unit reaches a specified value or more.

Further, the medium has a plurality of zones, and has the medium transfer rates that differ from one another on a zone basis. On the assumptions that a period of time required to transfer data from the host at the host transfer rate is a host transfer time, and that a period of time required to write data to the medium at the medium transfer rate is a medium transfer time, the command execution controller can determine the data transfer timing on the basis of the host transfer time, the medium transfer time corresponding to each of the zones, and the amount of free space of the temporary storage unit.

Still further, the transfer data is formed of a plurality of sectors. The command execution controller calculates the number of free sectors required for the temporary storage unit from a write ratio, which is calculated on the basis of the host transfer time per sector and the medium transfer time per sector, and from the number of sectors of the transfer data. As a result, the command execution controller can determine the data transfer timing on the basis of the result of the calculation.

In this case, the command execution controller refers to a table in which the write ratio is stored, and thereby can calculate the number of free sectors required for the temporary storage unit. Referring to the table makes it possible to reduce the overhead caused by calculation.

Furthermore, the command execution controller starts writing, to the medium, data of the temporary storage unit, and then adopts, as the data transfer timing, the timing at which the amount of free space of the temporary storage unit reaches a level equivalent to the number of free sectors. Thus, it is possible to determine the optimum data transfer timing.

A power saving method of a media drive that exchanges a command and transfer data with a host by means of serial communications performed by a serial communication circuit, according to another aspect of the present invention, is characterized by including the steps of: when transferring, to the host, the transfer data that has been read out from a medium into a temporary storage unit according to a read command, and/or when receiving, from the host into a temporary storage unit, transfer data to be written to the medium according to a write command, controlling the data transfer timing at which the transfer data is transferred from the temporary storage unit to the host, or the data transfer timing at which the transfer data is transferred from the host to the temporary storage unit, so as to generate a transfer unnecessary period during which the command and the transfer data need not be exchanged with the host; and bringing the serial communication circuit into a power save mode during the transfer unnecessary period.

According to the present invention, regardless of a read command or a write command, the optimum data transfer timing at which data is transferred to/from the host is determined so as to generate a transfer unnecessary period, and then the serial communication circuit is brought into the power save mode, which makes it possible to reduce the power consumption.

According to the present invention, the data transfer timing of transferring data to/from the host is controlled so as to generate a transfer unnecessary period during which the command and the transfer data need not be exchanged with the host, and the serial communication circuit is brought into the power save mode. As a result, it becomes possible to reduce the power consumption required for serial communications.

DETAILED DESCRIPTION OF THE INVENTION

Specific embodiments to which the present invention is applied will be below described in detail with reference to drawings. In the SATA II, the Native Command Queuing (NCQ) protocol is newly defined so that the start timing of data transfer can be determined on the HDD side. In this embodiment, the present invention is applied to a HDD capable of, by use of a function of determining the start timing of data transfer on the HDD side just like, for example, the SATA II, reducing the occupancy time required when a command and data are transferred through a transmission line (bus) between the HDD and a host so that the power consumption can be reduced, and is also applied to a data transfer method thereof.

In the NCQ protocol, the function of determining the start timing of data transfer on the HDD side is called "First Party DMA". This is a function that permits the drive to set up the DMA (Direct Memory Access) operation for data transfer without the intervention of driver software on the host controller side. FIS called DMA Setup FIS is here provided to allow the HDD to select DMA context on the host controller side. Incidentally, the FIS (Frame Information Structure) is a structure of a frame that is a basic transfer unit of the SATA.

The DMA Setup FIS stores information including tag numbers (0-31) associated with corresponding commands for which the DMA setup is performed, and the amount of data (DMA Transfer Count) transferred to the host controller. The host controller carries out the DMA transfer processing on the basis of the DMA Setup FIS received from the HDD. In this embodiment, this function is used by the HDD so that the start timing of data transfer is adaptively adjusted. This makes it possible to reduce the power consumption and to improve the performance.

Incidentally, although this embodiment describes an example in which the NCQ protocol of the SATA II is used, the present invention is not limited to the SATA II protocol. By applying the present invention to a media drive having a function of determining the start timing of data transfer on the drive side, it becomes possible to reduce the power consumption required by communications between the media drive and a host, to improve the performance of the media drive, and to achieve effective power saving.

Figure 1:
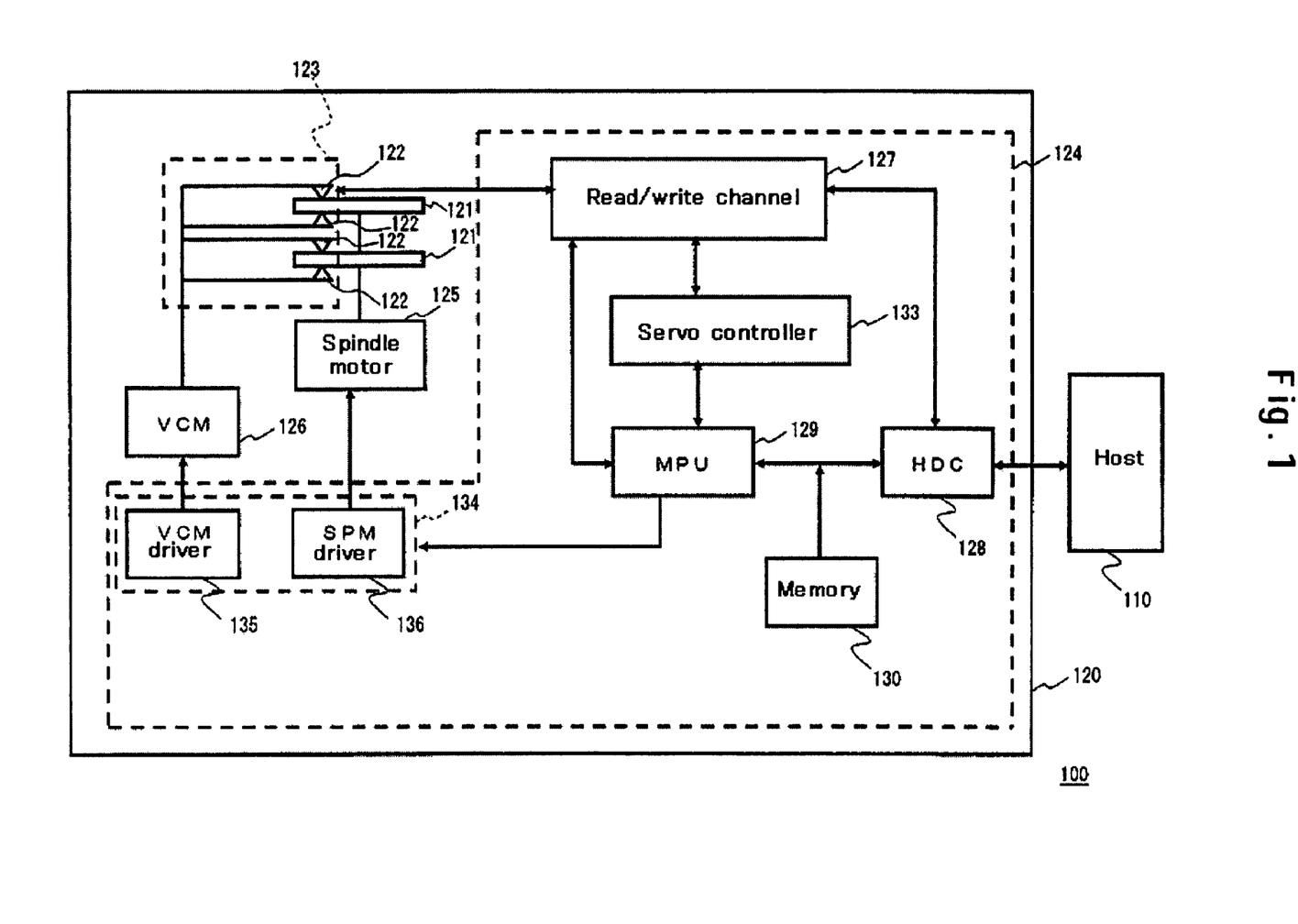
FIG. 1 is a block diagram schematically illustrating a configuration of a data processing system according to an embodiment of the present invention.

To begin with, a data processing system including a HDD and a host according to this embodiment will be described. FIG. 1 is a block diagram schematically illustrating a configuration of a data processing system 100 according to this embodiment. The data processing system 100 includes: higher level equipment (host) 110 for performing data processing, such as a computer or a digital camera; and a HDD 120 that is a storage device for storing data transmitted from the host 110. The HDD 120 includes in a frame: one or more magnetic disks 121 by way of example of a medium; a head stack assembly 123 including one or more magnetic heads 122, each of which is associated with a recording surface of each magnetic disk; and a controller 124 for controlling these elements so that data is read/written from/to the magnetic disks 121.

Host user data transmitted from the host 110 is subjected to necessary processing and converted into a write signal by the controller 124 before the write signal is sent to the head stack assembly 123. According to the acquired write signal, the magnetic head 122 writes data to a recording surface of the magnetic disk 121. On the other hand, a read signal read out from the magnetic disk by the magnetic head 122 is converted into a digital signal and subjected to necessary processing by the controller 124 before the signal is transmitted to the host 110.

The magnetic disk 121 is a nonvolatile recording medium having magnetic layers which are magnetized to record data. When the HDD 120 is operating, the magnetic disk 121 is driven at a prescribed constant speed for rotation around a spindle of the spindle motor 125. When the HDD 120 is not operating, the magnetic disk 121 remains stationary. On the surface of the magnetic disk 121, a plurality of tracks are concentrically formed as blocks for storing data. Further, each track is divided into a plurality of sectors in the circumferential direction.

On the surface of the magnetic disk 121, servo data storage areas are formed. Typically, the magnetic disk 121 has a plurality of servo data storage areas formed along the radial direction. In addition, a servo data storage area and a user data storage area are formed in each sector. Servo data is read out by the magnetic head 122, making it possible to acquire information about a position of the magnetic head 122. The servo data includes: track data having track number information; sector data having sector number information; and a burst pattern.

The head stack assembly 123 is mounted in the frame so as to be able to pivotally move along the surface of the magnetic disk 121. The head stack assembly 123 is driven by a voice coil motor (VCM) 126. The head stack assembly 123 is provided at its tip with the magnetic heads 122 each comprising a slider and a magnetic thin film element. As the head stack assembly 123 pivotally moves, the magnetic heads 122 move in the radial direction of the magnetic disks 121 over the surfaces thereof. This allows the magnetic heads 122 to access a desired track.

The head stack assembly 123 has two magnetic heads 122 for each magnetic disk 121 and the two magnetic heads are respectively associated with the top and bottom surfaces of the magnetic disk 121. If data is not written or read, the magnetic head 122 typically is unloaded onto a ramp mechanism (not illustrated) disposed outside the magnetic disk 121. However, if a CSS (Contact Start and Stop) method is used, the magnetic head 122 is unloaded onto a CSS zone disposed on the inner circumference. The magnetic head 122 writes data to the magnetic disk 121, or reads servo data and user data from the magnetic disk 121.

As shown in FIG. 1, the controller 124 includes a read/write channel (R/W channel) 127, a hard disk controller (HDC) 128, a microprocessor unit (MPU) 129, a memory 130, a servo controller 133, and a motor driver unit 134. The motor driver unit 134 includes a voice coil motor driver (VCM driver) 135 and a spindle motor driver (SPM driver) 136.

The R/W channel 127 performs write processing on data obtained from the host 110. In the write processing, the R/W channel 127 performs code modulation on write data supplied from the HDC 128, and then converts the code-modulated write data into a write signal (electric current) to supply the write signal to the magnetic head 122. The magnetic head 122 writes the data to the magnetic disk 121 by letting current flow through the coils according to the obtained signal. In the meantime, when data is supplied to the host 110, read processing is performed. In the read processing, data is picked up from a read signal supplied from the magnetic head 122, and is subjected to decode processing, by the read/write channel 127. The decoded read data is supplied to the HDC 128.

Operating according to microcodes loaded to the memory 130, the MPU 129 executes not only the general control of the HDD 120, including positioning control of the magnetic head 122, interface control, and defect management, but also data processing-related necessary processing. When the hard disk drive 120 is started, the microcodes to operate on the MPU 129 and the data to be required for control and data processing are loaded to the memory 130 from the magnetic disk 121 or a ROM (not shown).

Digital data read out by the R/W channel 127 includes not only user data from the host 110 but also servo data. The servo controller 133 extracts servo data from read data obtained from the R/W channel 127. The servo data includes track data, sector data, and a burst pattern. The extracted servo data is transferred from the servo controller 133 to the MPU 129.

According to the microcodes, the MPU 129 performs the positioning control processing on the magnetic head 122 by use of the servo data. Control data from the MPU 129 is output to the VCM driver 134. The VCM driver 134 supplies driving current to the VCM 126 according to the control signal. In addition, the MPU 129 stores SPM control data in a register of the motor driver unit 134 according to the microcodes in order to control the rotation of the spindle motor 125. The SPM driver 136 executes the rotational control of the spindle motor 125 according to the stored SPM control data.

The HDC 128 has a function of interfacing with the host 110. The HDC 128 receives user data, control data including read and write commands, and the like, transferred from the host 110. The user data received is transferred to the R/W channel 127. In addition, the HDC 128 transfers to the host 110 read data from the magnetic disk, acquired from the R/W channel 127, or control data used for data transfer. Moreover, the HDC 128 executes error correction processing on the user data, and the like.

The data transfer of control data and user data between the HDC 128 and the host 110 is controlled by microcodes operating on the hard disk controller 128 and the MPU 129. In particular, the HDD 120 in this embodiment has a command queuing function of queuing specified commands from the host 110. The command execution order in the HDC 128, or the transfer order of control data and user data between the host and the device, is controlled and managed from the viewpoint of an improvement in performance of the HDD 120.

A description will be made of command queuing, and a command processing method for executing a command between the host and the device, more specifically, between the host 110 and the HDD 120. In an interface between the host and the device according to this embodiment, the HDD 120 can internally control the execution order of specified processing, which makes it possible to achieve an improvement in performance of the HDD 120. In particular, in data communications between the host and the device according to this embodiment, the timing of transferring data to the host 110 can be determined on the side of the HDD 120. In addition, data transfer processing required by a plurality of commands can be concurrently performed. Accordingly, it is possible to improve the execution performance of a plurality of commands stored in a queue.

Figure 2:
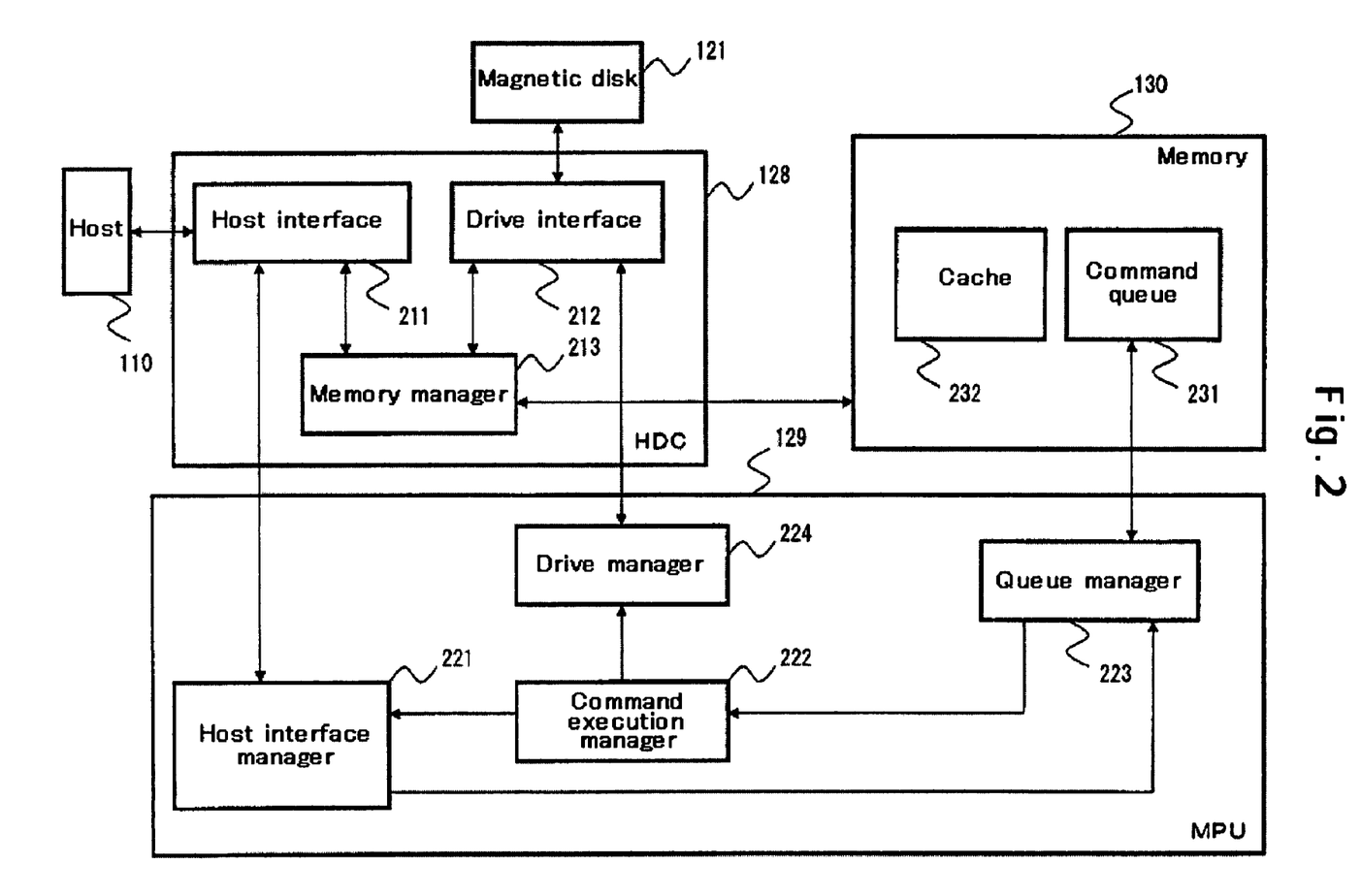
FIG. 2 is a block diagram illustrating a substantial part that executes data transfer processing between a host and a device in an interface between the host and the device according to an embodiment of the present invention.

FIG. 2 is a block diagram illustrating a substantial part that executes data transfer processing between the host and the device in an interface between the host and the device according to this embodiment. The HDC 128 includes a host interface 211, a drive interface 212, and a memory manager 213. Microcodes operating on the MPU 129 instruct the MPU 129 to function as a host interface manager 221, a command execution manager 222, a queue manager 223, and a drive manager 224. The memory 130 temporarily stores commands and data therein, and can function as a command queue 231 and a cache 232 that is a temporary storage unit. The cache stores not only transfer data (read data or write data), which is temporarily stored, but also information such as a LBA (Logical Block Address), and the length, of the transfer data.

The host interface 211 actually transfers data to/from the host 110. In the SATA, data and commands are exchanged with a host by use of Register FIS for transferring contents of a register from the host to the device at the time of issuing a command, Data FIS used during data transfer, and the like. After serial communications between the host and the device is established, in addition to the exchange using this FIS, control characters, which are called "Primitive", are exchanged with the host (Primitive Handshake) to keep the serial communications with the host established. Even if user data, a command, and the like, are not exchanged with the host to perform write or read processing, therefore, a serial communication circuit included in the host interface 211 is always kept in an active state to exchange primitives, and consequently the electric power is consumed.

For this reason, in the SATA, it is possible to provide two power saving modes (stop modes), "Partial" and "Slumber", in which a serial communication circuit is brought into a power saving state by partially stopping the serial communication circuit for performing serial communications with a host. The "Partial" mode is a stop mode that does not exert an influence upon throughput because the transition time from the "Partial" mode to a normal mode (Active mode) in which serial communications with the host can be carried out is 10 μsec or less, which is sufficiently short with respect to the usual command execution time. On the other hand, the "Slumber" mode is a stop mode in which the transition time from the "Slumber" mode to the normal mode is 10 msec or less, and only if the MPU 129 or the host judges that no influence is exerted upon throughput, the transition is possible.

The "Partial" mode is a stop mode that is achieved, for example, by partially stopping the power supply to the serial communication circuit because the transition time is limited. In contrast to this, since the transition time from the "Slumber" mode to the normal mode is allowed to be longer, it is possible to stop, for example, the power supply to the serial communication circuit. The "Slumber" mode, therefore, can be set as a mode that can substantially eliminate the need for the power consumption required for serial communications. If the transition to the "Partial" or "Slumber" mode has taken place, the MPU supplies the electric power, if necessary, to part or all of the serial communication circuit included in the host interface 211 so as to make the transition to the normal mode.

In this embodiment, as described below, it is possible to reduce the power consumption by the steps of: determining on the HDD side the start timing of transferring transfer data to the host; minimizing the occupancy time during which a SATA bus is occupied by transfer of a command and data; positively generating a transfer unnecessary period that need not exchange a command and transfer data; and during this period of time, bringing the serial communication circuit into the power saving state.

The drive interface 212 performs actual data input-output processing from/to the magnetic disk 121 (or from/to the read/write channel 127) that is an example of a medium. The memory manager 213 controls how to store data in the memory 130. The memory manager 213 also performs intermediatory processing of a command and user data between the memory 130 and other function blocks in the hard disk controller 128.

The host interface manager 221 manages the host interface 211, and transmits/receives a specified notification or command to/from the host interface 211. In addition, the host interface manager 221 functions as an interface between the hard disk controller 128 and other logical blocks that function in the MPU 129. On the basis of data such as a notification or a request, which are acquired from other function blocks, the host interface manager 221 controls the transfer order of the command completion notification, and the like, which are transmitted from the host interface 211 to the host 110. Moreover, in this embodiment, as described below, the optimum start timing of transferring data from the cache 231 to the host (the optimum start timing of transferring data from the host to the cache 231) is determined on the basis of a data transfer rate at which data is transferred from the cache 232 to the host (or a data transfer rate at which data is transferred from the host to the cache 232), and the data read speed at which data is read out from the magnetic disk 121 into the cache 232 (or the data write speed at which data is written from the cache 232 to the magnetic disk 121).

The queue manager 223 functions as a command manager that classifies commands queued in the command queue 231, and that on the basis of the result of the classification, executes rescheduling to determine the appropriate command execution order from the viewpoint of the performance optimization. The queue manager 223 determines the execution order according to given algorithm in consideration of various kinds of parameters. There are many parameters to be referred to, for example, the seek length, an access starting position, an actuator operation profile, positioning in a rotation direction, a cache state, and the like. Incidentally, since the rescheduling algorithm of the command execution order is a broadly known technology, the detailed description thereof will be omitted.

Here, in this embodiment, the HDD positively generates a transfer unnecessary period of a command or of transfer data by allowing the above-mentioned host interface manager 221 to determine the optimum start timing of data transfer. This period of time can be used not only as the power save period but also as a period during which a command can be freely issued from the host to the HDD. For example, the number of command queues 231 in the SATA II is one; and the number of commands that can be queued is 32. Accordingly, generating a transfer unnecessary period enables the host to easily issue commands to the HDD. Even if the number of queues and the number of commands that can be queued are small, the HDD can make effective use of the queue. This makes it possible to improve the efficiency of the execution of commands with rescheduling.

The command execution manager 222 controls the execution of commands on the basis of the result of the classification by the queue manager 223, and the command execution order determined by the queue manager 223. The drive manager 224 controls writing/reading data to/from the magnetic disk 121 by controlling the drive interface 212. The drive manager 224 controls the drive interface 212 in response to a request from the command execution manager 222.

Figure 3:
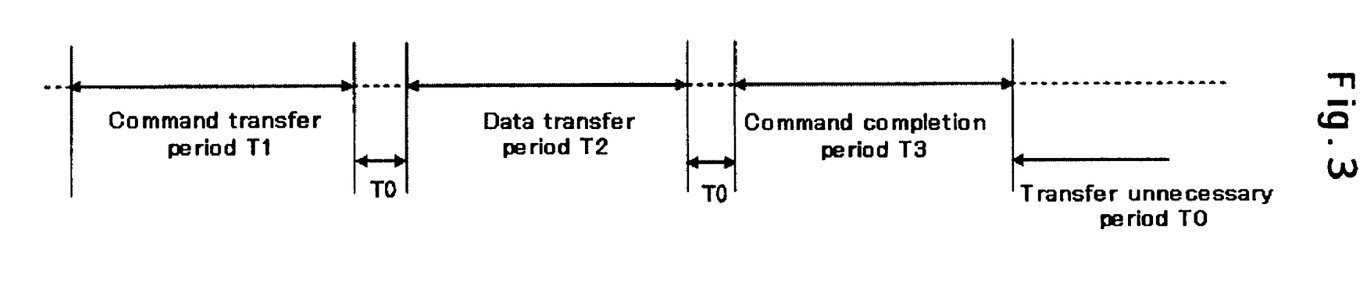
FIG. 3 is a schematic diagram illustrating a state of write data on a recording surface of a magnetic disk.

Embodiments of the present invention will be described below in more detail. FIG. 3 is a diagram illustrating a period during which a bus is occupied as a result of exchanging a command and transfer data between the HDD and the host. As shown in FIG. 3, in the NCQ, there are three periods: a period from the time when the host issues a NCQ command to the HDD to the time when the HDD clears a busy state (hereinafter referred to as a "command transfer period T1"); a period during which data is transferred between the HDD and the host (hereinafter referred to as a "data transfer period T2"); and a period during which the HDD notifies the host of the completion of a command (hereinafter referred to as a "command completion period T3"). Further, there are transfer unnecessary periods T0 during which no data (command and transfer data) is exchanged between the host and the HDD. The transfer unnecessary periods T0 correspond to periods excluding the three periods. Since no command and no transfer data are exchanged during the transfer unnecessary periods T0, it is possible to carry out power saving of a serial communication interface part, in response to a request from the host, or by the HDD itself.

Processing during the command transfer period T1, the data transfer period T2, and the command completion period T3 will be described. During the command transfer period T1, Register FIS is transmitted which transfers contents of a register from the host to the device at the time of issuing a command. A command included in Register FIS is, for example, a read command (for example, Read FPDMA (First Party DMA) Queued) or a write command (for example, Write FPDMA Queued). These commands include a tag field for identifying whether or not to be queued. For the NCQ, 32 commands are respectively identified by tags that denote 0 through 31. Besides the tag field, the commands include a start sector (LBA), the number of sectors that indicates the data length, a command ID for identifying a read command or a write command, and other control data such as data used for cache control.

Additionally, in this embodiment, during the data transfer period T2, the HDD issues to the host a setup frame (DMA Setup FIS) used for data transfer so as to control transfer of read data or of write data. The setup frame includes: a "Transfer direction" field that specifies a transfer direction in which read data or write data is transferred; a "Tag" field for identifying an unfinished command that is queued, and that requires data transfer; an "Offset" field that specifies an offset of transfer data so as to allow partial data corresponding to one command to be transferred; a "Transfer data byte" field that specifies the number of bytes of data to be transferred so as to allow partial data corresponding to one command to be transferred together with an offset; and a "Control data" field that includes a frame type, and information about control data transfer. After issuance of this setup frame, read data or write data (Data FIS) is transferred.

In addition, on completion of transfer of read data or write data, a command completion notification (for example, Set Device Bits FIS) is transmitted from the HDD to the host during the command completion period T3. The command completion notification, for example, includes: a "Control data" field containing information about a frame type, and the like; and a "Command status" field (for example, SActive) that denotes a status of each command identified by each tag. The host interface manager 221 can control the transmission of this command completion notification. The timing of outputting a command completion notification corresponding to each command is not limited to timing immediately after the completion of the command. From the viewpoint of the improvement in performance, the command completion notification can be output to the host 110 at proper timing.

Here, if these periods T1 through T3 can be shortened, in other words, if it is possible to shorten the bus occupation time during which the bus is occupied by the command and the transfer data, it is possible to lengthen the transfer unnecessary period T0 during which no data is transferred to/from the host. As described above, with the serial communications, even during the transfer unnecessary period T0, the primitive exchange causes the serial communication circuit to consume the electric power for maintenance of the serial communications functioning between the host and the HDD even when no command and no transfer data are exchanged; however, the serial communication circuit can be brought into the power saving mode, whereby it is possible to reduce the power consumption required to maintain the serial communications functioning. In this embodiment, among the above periods T1 through T3, the data transfer period T2 is shortened as much as possible to make the transfer unnecessary period T0 longer, and thereby the serial communication circuit is positively brought into the power saving mode so that the power consumption of the SATA bus is reduced.

To be more specific, among these three periods T1 through T3 during which the bus is used, the command transfer period T1 and the command completion period T3 are determined by a transfer rate of the SATA bus. On the other hand, as for the data transfer period T2, the bus occupation time of the SATA bus can be controlled by adjusting the start timing of data transfer from the HDD. For this reason, in this embodiment, the bus occupation time of the SATA is minimized by adaptively adjusting the start timing of data transfer.

The first essential step for minimizing the bus occupation time of the SATA, in other words, the first essential step for minimizing the transfer time of data, is to avoid the delay in data transfer to/from the host, which is caused by reading/writing from/to the magnetic disk. To be more specific, data should be temporarily read out from the magnetic disk into a cache before transferring the data to the host. When transferred from the host, data is temporarily stored in the cache before it is written from the cache to the magnetic disk. Usually, as compared with a read rate from the magnetic disk or a write rate to the magnetic disk (hereinafter referred to as a "medium transfer rate"), a data transfer rate when data is transferred between the host and the HDD (hereinafter referred to as a "host transfer rate") is higher. For example, when read data is transferred, if it is read out from the magnetic disk into the cache concurrently with data transfer from the cache to the host, the data transfer to the host is delayed.

For this reason, in this embodiment, judging from the data transfer rate (host transfer rate) at which data is transferred to/from the host, and the read rate and the write rate (medium transfer rate) at which data is read/written from/to a medium, the optimum start timing of data transfer is determined so that the data transfer time (the host transfer time) taken to transfer data between the host and the HDD becomes shortest, in other words, so that data transfer to/from the host is not delayed.

The SATA II supports two kinds of data transfer rates, 150 MB/sec and 300 MB/sec, at which data is transferred to/from the host. Data transfer is performed at the maximum rate supported by both the host and the HDD. When serial communications between the host and the HDD is established, the data transfer rate is set at the maximum rate supported by both the host and the HDD. Additionally, the medium transfer rate, which is equivalent to the read rate to the medium or the write rate to the medium, is determined by a drive's ZONE in which a LBA requested by the command exists.

Figure 4:
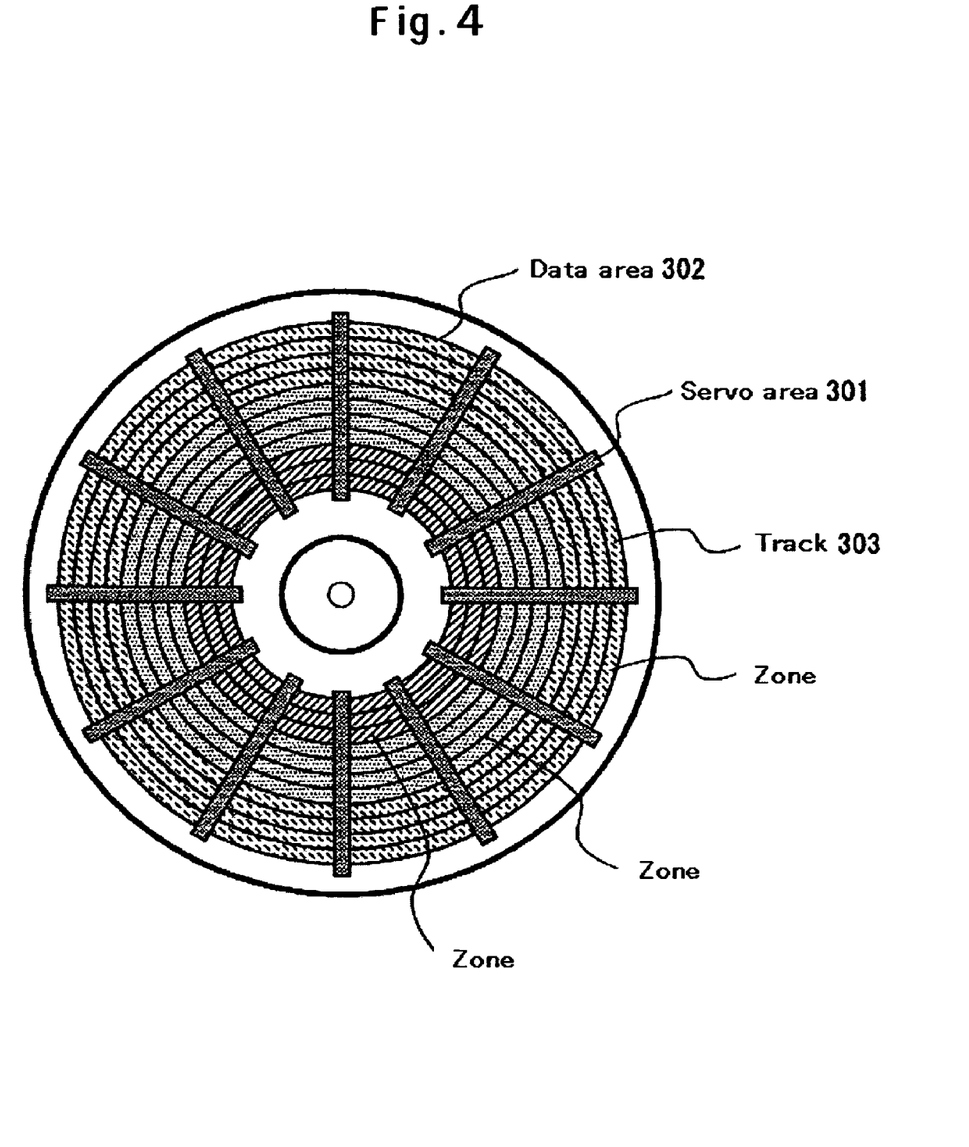
FIG. 4 is a diagram illustrating a period during which a bus is occupied as a result of exchanging a command and transfer data between the HDD and the host.

FIG. 4 is a schematic diagram illustrating a state of write data on a recording surface of the magnetic disk 121. As shown in FIG. 4, on the recording surface of the magnetic disk 121, a plurality of servo areas 301 are formed at intervals of a specified angle. Each of the servo areas 301 extends in the radial direction from the center of the magnetic disk 121. There are also provided a plurality of data areas 302, each of which is formed between two adjacent servo areas 301. Thus, the servo areas 301 and the data areas 302 are alternately provided at intervals of the specified angle. On the magnetic disk 121 that is a recording medium associated with a magnetic head used to write data, servo data used for the positioning control of a head element 122 is written to each of the servo areas 301. User data is written to each of the data areas 302.

Moreover, a plurality of tracks 303, each of which has a given width in the radial direction, are concentrically formed on the recording surface of the magnetic disk 121. The servo data and the user data are written along the track 303. The servo data helps the magnetic head used for writing data to follow a concentric track. One track 303 between the servo areas 301 includes a plurality of data sectors, each of which is the unit of writing user data. In addition, the tracks 303 are grouped into a plurality of zones according to their positions in the radial direction of the magnetic disk 121. The number of sectors included in one track 303 is set in each zone. Changing a recording frequency on a zone basis enables an improvement in recording density. It is to be noted that although FIG. 4 illustrates only three zones for the sake of simplicity of description, a magnetic disk has, for example, about 10 to 20 zones.

As described above, the read rate from the magnetic disk or the write rate to the magnetic disk (the medium transfer rate) is determined by which zone a LBA of read data or of write data exists in. A period of time taken to read out read data, or taken to write write-data, after the magnetic disk is accessed, is a medium rate×the data length (the number of sectors) in the zone in question. As described in this embodiment, if the plurality of kinds of data transfer rates of data transfer between the HDD and the host are present, and the magnetic disk has, for example, 20 zones, there are 20 medium transfer rates, each of which corresponds to each zone.

The data transfer timing of transferring data between the HDD and the host is therefore determined by the steps of: from the host transfer rate and the medium transfer rate, calculating a read period after accessing the magnetic disk (a data read period after accessing the magnetic disk), or a write period (a data write period after accessing the magnetic disk); from a cylinder, a head, and a LBA, calculating a period of time (the seek time+the rotational latency) until the magnetic disk is accessed; and on the basis of these values, calculating the optimum data transfer timing. Here, the seek time is a period of time until a head is positioned at a target track on a disk. The rotational latency is a period of time after moving of the head to the track until the head arrives at a target sector in the track as a result of the rotation of the disk.

Taking read processing by a read command as an example, a specific description will be given below. For example, it is assumed that a read command for handling data equivalent to 200 sectors is issued during operation, a host transfer rate of which is 300 MB/sec, and that a medium transfer rate in a zone in which a LBA thereof exists is 60 MB/sec. A period of time taken to transfer transfer-data equivalent to one sector from the cache of the HDD to the host (the host transfer time) is about 3.4 µsec. A period of time taken to read out, by the HDD, transfer data equivalent to one sector from the magnetic disk into the cache (the medium transfer time) is about 8.5 µsec. Accordingly, a period of time required to transfer the data equivalent to 200 sectors is 680 µsec on the host side, and 1700 µsec on the medium side. In this case, in order to complete data transfer from the cache to the host roughly concurrently with data read from the magnetic disk into the cache, it is necessary to read ahead data from the magnetic disk into the cache by 1020 µsec, that is, by 120 sectors or more. If the data transfer to the host is started at the point of time when 120 sectors or more have been read ahead, the data read from the magnetic disk can be completed without delaying the data transfer to the host.

The number of sectors to be read ahead can be calculated by the method described below. It is assumed that: the total number of sectors to be read out by a read command is the total number of sectors S; the number of sectors to be read ahead is the number of read-ahead sectors S1; a period of time per sector taken to read out data from the disk into the cache is medium transfer time t; and a period of time per sector taken to transfer data from the cache to the host is host transfer time T. The number of sectors to be read ahead is determined by the following equation:

(The total number of sectors S−the number of read-ahead sectors S1)×the medium transfer time t=the total number of sectors×the host transfer time T       (1)

Here, the number of read-ahead sectors S1 is calculated as follows:

The number of read-ahead sectors S1=the total number of sectors S×(1−the host transfer time T/the medium transfer time t)

Accordingly, the number of read-ahead sectors S1 can be expressed below. As a result, the number of read-ahead sectors S1 can be easily calculated from a read-ahead ratio α and the total number of sectors S of read data (the data length requested by the read command).

The number of read-ahead sectors S1=the total number of sectors S×the read-ahead ratio α where:

The read-ahead ratio α=1−(the host transfer time T)/(the medium transfer time)       (2)

This read-ahead ratio α is a value indicating a ratio (per sector) of transfer data to be read ahead from the magnetic disk into the cache.

As described above, the magnetic disk usually has tens of zones; and medium rates (i.e., the medium transfer time) differ from one another on a zone basis. In addition, there are a plurality of kinds of data transfer rates for data transfer between the host and the HDD in some cases. For example, the SATA II supports two kinds of data transfer rates, 150 MB/sec and 300 MB/sec. For this reason, in this embodiment, with respect to each data transfer rate and each medium rate, a read-ahead ratio α per sector for each zone of the magnetic disk is calculated beforehand, and the results of the calculation are stored as a table. This makes it possible to minimize the overhead caused by the calculation of the number of read-ahead sectors S1.

To be more specific, for example, if the number of kinds of data transfer rates is two, and the number of zones is 20, respective values corresponding to 40 kinds of read-ahead ratios α are only stored as a table. This makes it possible to calculate the number of read-ahead sectors S1 extremely easily. As a result, it is possible to determine the optimum data transfer timing of transferring data from the cache to the host.

Next, write operation by a write command will be described. As is the case with the read operation, also in the write operation, it is desirable that data transfer from the host to the cache of the HDD be started at the optimum timing.

How to calculate this timing is also basically similar to the case of the read operation. Accordingly, it is possible to calculate the timing in a manner similar to the above equation (1). To be more specific, it is assumed that: the total number of sectors to be written by the write command is the total number of sectors S; the amount of free space required for the cache is the amount of free space S1; a period of time per sector taken to write data from the cache to the magnetic disk is medium transfer time t; and a period of time per sector taken to transfer data from the host to the cache is host transfer time T. As is the case with the above-mentioned equation (1), the following equation (3) holds:

(The total number of sectors S−the amount of free space S1)×the medium transfer time t=the total number of sectors×the host transfer time T       (3)

The amount of free space S1, which is required for the cache in advance, is therefore determined by the undermentioned equation (4). Accordingly, the amount of free space S1 can be easily calculated from the write ratio β and the total number of sectors S of write data (the data length requested by the write command) as below.

The amount of free space S1=the total number of sectors S×the write ratio β where, the write ratio β=1−(the host transfer time T)/(the medium transfer time)       (4)

This write ratio is a value indicating a ratio per sector of data that needs be moved from the cache to the magnetic disk beforehand.

Here, if the amount of free space S2 of the cache, which is currently available, is larger than the amount of free space S1, it is not necessary to move data from the cache to the magnetic disk before write data is transferred from the host to the HDD. To be more specific, even if writing from the cache to the medium is started concurrently with data transfer from the host, the data transfer from the host is not delayed. Accordingly, it is possible to write the write data to the magnetic disk concurrently with the timing at which transfer of the write data from the host to the cache is started, or at the arbitrary timing after the start of the data transfer.

On the other hand, the available amount of free space S2 of the cache may be smaller than the amount of free space S1 that is required. In this case, writing the data from the cache to the magnetic disk at the timing at which the data transfer from the host to the cache is started causes the cache to run short of the amount of free space. Consequently, the data transfer from the host is delayed. The data transfer from the host to the cache, therefore, is started at or after the timing at which the amount of free space of the cache becomes S1.

This timing can be calculated from the write ratio β described above. To be more specific, the amount of free space S1, which is required for data transfer in advance, is calculated from the write ratio β and the number of sectors S of write data. Then, the amount of free space S3, which is a difference between the amount of free space S1 and the amount of free space S2 that is currently available, is determined as follows: S3=S1=S2. The data transfer from the host has only to be started at the timing at which data, the size of which is the number of sectors equivalent to the amount of free space S3, has been written from the cache to the medium, or at the timing after that. Likewise, if the cache currently has no available amount of free space, the data transfer from the host to the cache has only to be started at the timing at which data, the size of which is the number of sectors equivalent to the amount of free space S1, has been moved from the cache to the magnetic disk.

Moreover, in particular in the SATA II, it is possible to further minimize the data transfer time by determining the start timing of data transfer also in consideration of the transfer time of DMA Setup FIS, the start time of data transfer by microcodes, whether or not to make a track move on a medium, and the like.

During the transfer unnecessary period T0, more specifically, the period from when the command transfer period T1 ends until the data transfer period T2 starts, the period from when the data transfer period T2 ends until the command completion period T3 starts, or the period after the command completion period T3 ends, it is possible to bring the serial communication circuit into the power saving mode by the host or the MPU of the HDD. This, in turn, makes it possible to save the power consumption by the serial communications. Here, the SATA II has two power saving modes as described above. The power saving modes, therefore, can be switched in response to, for example, the length of the transfer unnecessary period T0. In another case, it is also possible to control the power saving modes as follows: during the period from when the command transfer period T1 ends until the data transfer period T2 starts, and during the period from when the data transfer period T2 ends until the command completion period T3 starts, bringing the serial communications into the "Partial" mode; and after the command completion period T3 ends, bringing the serial communications into the "Slumber" mode.

Incidentally, the present invention is not limited to the embodiments described above, and as a matter of course, the present invention can be changed in various ways within the range departing from the gist of the present invention. For example, as described above, since the bus is not occupied by commands and transfer data during the transfer unnecessary period T0, the host can issue commands to the HDD at any time during the transfer unnecessary period T0. To be more specific, the transfer unnecessary period T0 can also be made use of as a period during which other NCQ commands are received from the host. Accordingly, if the command queue can store another command, it is possible to receive a NCQ command so as to increase the number of commands currently stored in the queue. By increasing the number of commands stored in the queue, it is possible to efficiently rearrange the execution order of the commands inside the HDD, making it possible to shorten the total processing time of the commands. Therefore, as described above, determining the optimum data transfer timing makes it possible to positively generate the transfer unnecessary periods T0 so that the power consumption is saved. In addition, if the number of commands currently stored is smaller than the maximum number of commands that can be stored in the command queue, the serial communications may also be kept operating if necessary, without being brought into the power saving mode, so that a command can be received.

In addition, the relationship between each circuit shown in FIGS. 1, 2 and the logical configuration is not limited to the above-mentioned example. A designer can design a storage device by use of effective functions and effective circuit configurations. In this embodiment, although the magnetic head is a read/write head capable of performing both write processing and read processing, the present invention can also be applied to a read dedicated device that performs only read processing. It is to be noted that although the present invention is in particular useful for magnetic disk storage devices, the present invention can also be applied to storage devices in other modes, such as optical disk storage devices, which drive a medium as a storage medium.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A media drive that communicates with a host by means of serial communications, said media drive comprising:
a temporary storage unit which temporarily stores transfer data read out from a medium;
a serial communication unit which transfers, to the host, the transfer data read out from the temporary storage unit;
a command execution controller which controls the execution of one or more commands so as to generate a transfer unnecessary period during which the one or more commands and the transfer data need not be exchanged with the host; and
a communication controller which brings the serial communication unit into a power save mode during the transfer unnecessary period;
wherein the command execution controller calculates an optimum start timing of data transfer, at which the transfer data is transferred from the temporary storage unit to the host, so as to extend the transfer unnecessary period and begin the power save mode;
wherein the optimum start timing of data transfer is calculated on the basis of a medium transfer rate at which the transfer data is read out from the medium into the temporary storage unit, and a host transfer rate at which the transfer data is transferred from the temporary storage unit to the host;
wherein the optimum start timing of data transfer occurs prior to filling the temporary storage unit so that transfer of data to the host is not delayed;
wherein said medium has a plurality of zones and a plurality of medium transfer rates that differ from one another on a zone basis;
wherein since it is defined that a period of time required to transfer data to the host at the host transfer rate is a host transfer time, and that a period of time required to read out data into the temporary storage unit at a medium transfer rate corresponding to each of the zones is a medium transfer time, said command execution controller is configured to determine the read timing and the data transfer timing on the basis of the host transfer time and the medium transfer time corresponding to each of the zones; and wherein said transfer data is formed of a plurality of sectors and said command execution controller calculates a number of read-ahead sectors by multiplying the number of the sectors of the transfer data by a read-ahead ratio for each zone, which is calculated by dividing the host transfer time per sector by the medium transfer time per sector and subtracting the quotient from 1, and then adopts, as the data transfer timing, timing at which the transfer data, the size of which is equivalent to the number of read-ahead sectors, has been read out from the medium into the temporary storage unit;

wherein the host transfer rate is greater than the medium transfer rate.

2. A media drive according to claim 1, wherein:

when transferring transfer data stored in the medium to the host, if the host transfer rate is higher than the medium transfer rate, said command execution controller delays the data transfer timing by a specified period of time relative to the read timing at which the transfer data is read out from the medium into the temporary storage unit.

3. A media drive according to claim 2, wherein:

said specified period of time is a difference between a medium transfer time taken to read out the transfer data from the medium at the medium transfer rate and a host transfer time taken to transfer the transfer data in question to the host at the host transfer rate.

4. A media drive according to claim 1, wherein:

said medium has a plurality of zones; and said medium has the medium transfer rates that differ from one another on a zone basis.

5. A media drive according to claim 1, wherein:

said medium has a plurality of the medium transfer rates.

6. A media drive according to claim 1, wherein:

said command execution controller refers to a table in which the read-ahead ratio is stored, and thereby calculates the number of read-ahead sectors.

7. A media drive that communicates with a host by means of serial communications, said media drive comprising:

a serial communication unit which is configured to receive, from the host, transfer data to be written to a medium;

a temporary storage unit which temporarily stores the transfer data received from the host;

a command execution controller which controls execution of one or more commands so as to generate a transfer unnecessary period during which the one or more commands and the transfer data need not be exchanged with the host; and a communication controller which brings the serial communication unit into a power save mode during the transfer unnecessary period;

wherein said command execution controller calculates an optimum start timing of data transfer, at which the transfer data is transferred from the host to the temporary storage unit, so as to extend the transfer unnecessary period and begin the power save mode;

wherein the optimum data transfer timing is calculated on the basis of a medium transfer rate at which data in the temporary storage unit is written to the medium, and a host transfer rate at which the transfer data is transferred from the host to the temporary storage unit;

wherein the optimum start timing of data transfer occurs prior to filling the temporary storage unit so that transfer of data from the host is not delayed;

wherein said medium has a plurality of zones and a plurality of medium transfer rates that differ from one another on a zone basis; and since it is defined that a period of time required to transfer data from the host at the host transfer rate is a host transfer time, and that a period of time required to write data to the medium at the medium transfer rate is a medium transfer time, said command execution controller determines the data transfer timing on the basis of the host transfer time, the medium transfer time corresponding to each of the zones, and the amount of free space of the temporary storage unit; and wherein said transfer data is formed of a plurality of sectors, and said command execution controller calculates a number of free sectors required for the temporary storage unit from a write ratio for each zone, which is calculated on the basis of the host transfer time per sector and the medium transfer time per sector, and from the number of sectors of the transfer data, and then determines the data transfer timing on the basis of the result of the calculation;

wherein the host transfer rate is greater than the medium transfer rate.

8. A media drive according to claim 7, wherein:

if an amount of free space of the temporary storage unit is smaller than a size of the transfer data, said command execution controller adopts, as the data transfer timing, timing at which the amount of free space of the temporary storage unit reaches a predetermined value or more.

9. A media drive according to claim 7, wherein: said command execution controller refers to a table in which the write ratio is stored, and thereby calculates the number of free sectors required for the temporary storage unit.

10. A media drive according to claim 7, wherein: said command execution controller starts writing data of the temporary storage unit to the medium, and then adopts, as the data transfer timing, timing at which the amount of free space of the temporary storage unit reaches a level equivalent to the number of free sectors.

11. A media drive according to claim 7, wherein:

said medium has a plurality of medium transfer rates.

* * * * *